Jan. 9, 1940.  S. A. STAEGE  2,186,153
SHAFT BEARING
Filed Feb. 11, 1938
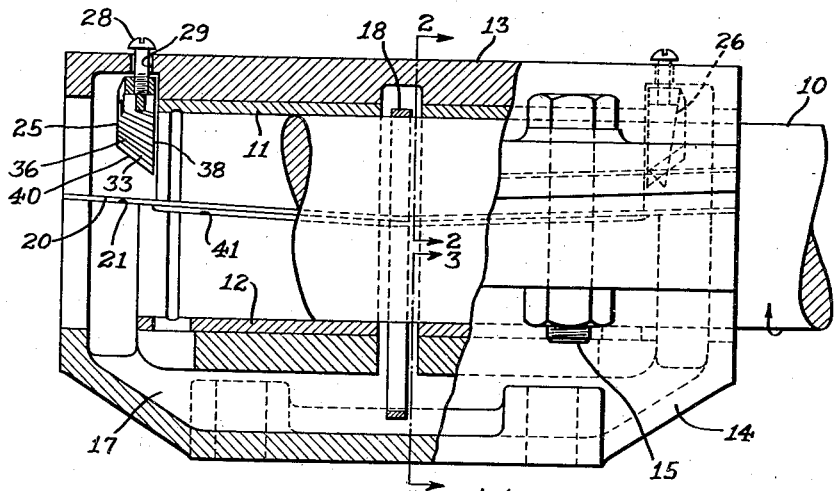
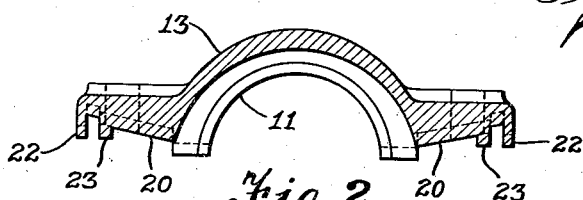
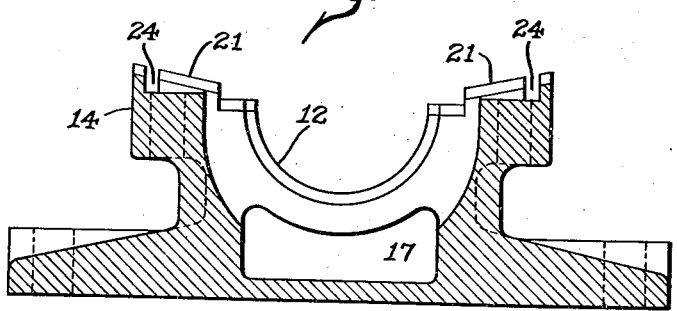
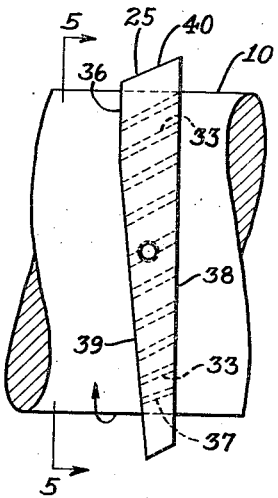
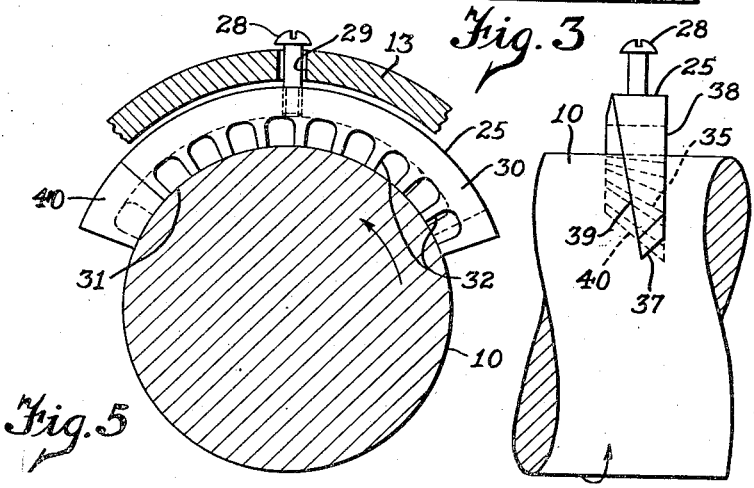
INVENTOR
Stephen A. Staege
BY Maréchal + Noi
ATTORNEY Patented Jan. 9, 1940

2,186,153

UNITED STATES PATENT OFFICE 2,186,153

SHAFT BEARING

Stephen A. Staege, Hamilton, Ohio, assignor to The Black-Clawson Company, Hamilton, Ohio, a corporation of Ohio Application February 11, 1938, Serial No. 189,934

13 Claims. (Cl. 308—36.5)

This invention relates to shafts and shaft bearings, and more particularly to means for maintaining the oil of the bearing in the bearing housing.

One object of the invention is the provision of an oil wiper adapted for use with a rotatable shaft, and so constructed as to effectively return all of the oil with which it contacts on the shaft, and to prevent the oil from creeping out along the shaft beyond the wiper.

Another object of the invention is the provision of a wiper of the character mentioned, having a number of successively acting wiping edges which are inclined toward the shaft bearing and in the general direction of shaft rotation, with some of such edges reaching out along the shaft further than others.

Another object of the invention is the provision of an oil wiper which is adapted to rest on the upper side of a rotatable shaft at one side of a shaft bearing, and having oil wiping edges for effectively returning oil toward the shaft bearing.

Another object of the invention is the provision of a bearing construction including bearing segments and upper and lower housing members for the segments, the joining portion of the upper and lower housing members being inclined upwardly and outwardly away from the bearing segments and from the bearing center, to maintain the oil within the housing.

Other objects and advantages of the invention will be apparent from the following description, the appended claims, and the accompanying drawing, in which:

Fig. 1 is a side elevation, partly in vertical section, showing a shaft bearing and wiper construction embodying the present invention;

Fig. 2 is a transverse section on the line 2—2 of Fig. 1 of the upper housing member of the bearing;

Fig. 3 is a section on the line 3—3 of Fig. 1 and showing the lower housing member;

Fig. 4 is a top plan view of the wiper applied to the top of the shaft;

Fig. 5 is a section on the line 5—5 of Fig. 4; and

Fig. 6 is a side elevation of the wiper and shaft.

Referring more particularly to the drawing by reference numerals, 10 is a rotatable shaft adapted to be driven in any suitable manner for the operation of machine parts, the shaft being supported for rotation in upper and lower bearing segments 11 and 12, held in upper and lower bearing housing members 13 and 14. The bearing segments each extend throughout almost one-half of a complete circle and are suitably held against endwise movement in the upper and lower housing members, which are connected to one another by means of vertically extending connecting bolts 15, with a small amount of clearance between the members to allow for wear of the relatively moving parts.

As herein shown, the bearing housing is so arranged as to prevent the loss of oil from the joint between the parts of the upper and lower housing members that are connected together. This oil or any other suitable lubricant, which is contained to a suitable level in the lubricant chamber 17, and which is distributed to the upper side of the shaft by means of an oil ring 18, has a tendency to be thrown out or creep along the horizontally extending mating surfaces of the flanged connections that are ordinarily employed, but as will be apparent from Figs. 1, 2, and 3, the bearing construction herein shown is so arranged that the facing portions of the upper and lower bearing housing flanges incline upwardly and outwardly away from the center of the bearing, these adjacent facing surfaces being shown at 20 and 21 in Figs. 2 and 3 as having an upward incline away from the bearing segments as well as away from the central transverse plane of the bearing so that oil, in order to find its way out of the bearing along these surfaces, is compelled to move upwardly and is therefore retained against loss. At the outer end of the upper wall 20 is a downturned flanged projection 22 which fits over the end of the wall 20 so as to form a cover which prevents dirt from entering into the bearing. Inwardly of each projection 22 is a rib 23 which projects downwardly into a recess or trough 24 extending longitudinally of the lower bearing housing, the ribs 23 serving as baffles which prevent oil from being thrown out of the bearing and returning any oil thrown against it into the recesses or troughs 24 which return the oil to the chamber 17 along horizontally grooved passages extending inwardly from the troughs 24 centrally between the opposite ends of the bearing, as indicated in Fig. 3.

To prevent the oil or other liquid from creeping out along the shaft, and to thus keep the shaft clean, oil wipers are provided at opposite ends of the bearing, these oil wipers being indicated at 25 and 26.

The oil wiper 25 is arranged with the bearing housing preferably on the upper side of the shaft 10 closely adjacent the end of the bearing segment 11 and above the end of the lower bearing segment 12, and is provided with oil scraping edges which effectively return oil, during the rotation of the shaft 10, towards the bearing segment 11. The wiper 25 is a piece of hard material, preferably of metal such as bronze, and is generally crescent-shaped, reaching downwardly toward its forward end on the upturning side of the shaft and also extending downwardly along the downturning side of the shaft. It acts, by reason of its own weight, so as to ride on the upper side of the shaft, and is preferably held loosely to the upper housing member 13 by means of a screw or bolt 28, threaded into the wiper 25 and extending loosely through a hole 29 in the upper housing member so that it will be held against any substantial movement in the direction of the shaft axis. It is thus removable with the upper housing member of the bearing, but can accommodate itself to the surface of shaft 10.

Referring more particularly to Figs. 4, 5, and 6, the wiper 25 has a body portion 30 and has a cylindrically curved shaft-engaging portion 31 fitting the surface of the shaft 10. A series of grooves 32 are provided in the wiper so as to form a series of oil wiping edges 33 which extend at a suitable angle to the generatrix of the cylinder defined by the surface 31 so that as the shaft moves in the direction of the arrow shown in Fig. 4, the oil scraping edges 33 will move any oil on the shaft with which they contact, towards the bearing segment 11. These edges 33 are inclined upwardly toward the bearing member in the direction of rotation of the shaft, on the forward part 35 of the wiper. The edges 33 on the rear part 36 of the wiper also incline toward the bearing in the direction of rotation, but since these edges lie on the downturning side of the shaft, they incline downwardly and thus form downwardly inclined channels which conduct oil towards the bearing segment when the shaft is stationary.

The forward part 35 of the wiper has a front wiping edge 37 which extends outwardly from the flat side 38 of the wiper to a point about opposite the end of the lower bearing segment 12, the side 39 which is remote from the bearing segment 11 being inclined so that the width of the wiper increases progressively from its leading end back to a point rearward of the center of the shaft. Thus the successive wiping edges 33 which lie forward of the center of the shaft, considered in the direction of shaft rotation, are progressively increased in length, reaching out from the bearing segment 11 increased distances in order that oil particles on the shaft which are not picked up and moved inwardly by one scraping edge may be engaged and moved inwardly toward the bearing by a succeeding scraping edge.

The width of the wiper vertically above the center of the shaft 10 is such that the scraping edge at the top of the shaft reaches outwardly beyond a transverse plane containing the end of the lower bearing segment 12 so that any oil particles carried around by the shaft from the end of the lower bearing segment will be picked up and returned by the forward portion 35 of the wiper. When the shaft is stationary there may be a tendency for oil particles to move downwardly along the wiping edges 33 of the forward portion of the wiper, since these edges 33 incline downwardly toward the side 39, but any such oil will be promptly picked up and returned as soon as the shaft starts to operate, since the top and rear portion of the wiper are of greater width and reach outwardly farther than the forward portion. At a suitable distance rearwardly beyond the center of the shaft 10 the sides of the wiper may be parallel, the width being a maximum at the rear portion, and greater than the width at the very top of the wiper so that oil will tend to move toward the bearing segment when the shaft is at rest, in view of the downward inclination given to the edges 33 at the rear portion of the wiper. The rear terminal end is preferably inclined downwardly and toward the bearing segment 11 as indicated at 40 in Fig. 4.

It will thus be apparent that any oil coming onto the shaft from the ends of the bearing segments will be promptly picked up and moved inwardly toward the right-hand end of the wiper 25 as viewed in Figs. 1 and 4, thus being carried inwardly beyond the end of the lower bearing segment so that it can be received in the longitudinally extending groove 41 which is provided on the downturning side of the shaft in the lower bearing segment to distribute oil along the length of the bearing. Oil will thus be prevented from moving out beyond the end of the wiper so that the shaft will be kept clean at all times.

The wiper 26 provided at the other end of the shaft is generally similar in construction although of complementary form and the helix angle of the wiping edges is of course opposite to provide wiping edges which incline in the direction of rotation towards the upper bearing segment 11.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An oil wiper adapted for use on a shaft at an end of a shaft bearing comprising a member having successively acting cylindrically concave shaft-engaging surfaces providing successively acting oil wiping edges which are inclined with respect to the cylinder generatrix so that said edges move oil toward the bearing as the shaft rotates, said edges starting at successively increasing distances along the shaft from the bearing.

2. An oil wiper adapted for use on a shaft at an end of a shaft bearing comprising a member having a cylindrically concave shaft-engaging portion having grooves at an angle to the cylinder generatrix providing successive inclined shaft-wiping edges with an initially acting edge reaching outwardly a lesser distance along the shaft than a following edge.

3. An oil wiper adapted for use on a shaft at an end of a shaft bearing, said wiper having a cylindrically concave shaft-engaging portion provided with successively acting oil-wiping edges which are inclined with respect to the cylinder generatrix so that all of said edges move oil toward the bearing as the shaft rotates, said wiper having its forward end extending downwardly on the upturning side of the shaft and having its rear portion extending downwardly on the downturning side of the shaft and of greater width than the forward end.

4. An oil wiper adapted for use on a shaft at an end of a shaft bearing, said wiper having a cylindrically concave shaft-engaging portion provided with successively acting oil wiping edges, said wiper having its forward end extending downwardly on the upturning side of the shaft with said edges inclined upwardly along the shaft toward the shaft bearing and having its rear portion extending downwardly on the downturning side of the shaft with said edges inclining downwardly toward the shaft bearing.

5. An oil wiper adapted for use on a shaft at an end of a shaft bearing, said wiper having a cylindrically concave shaft-engaging portion provided with successively acting oil wiping edges, said wiper having its forward end extending downwardly on the upturning side of the shaft with said edges inclined upwardly along the shaft toward the shaft bearing and having its rear portion extending downwardly on the downturning side of the shaft with said edges inclining downwardly toward the shaft bearing, said edges on the downturning side of the shaft extending out farther from the shaft bearing than any of the edges forward of the center of the shaft.

6. In a construction of the character described, in combination, a rotatable shaft, a bearing for said shaft, and an oil wiper at an end of the bearing overlying and partly encircling and carried by the shaft and resting thereon merely by its own weight, said wiper having a concave shaft-engaging portion having grooves providing a succession of wiping edges which are inclined with respect to the shaft axis toward the bearing in the direction of shaft rotation for the return of oil on the shaft toward the bearing.

7. In a construction of the character described, in combination, a rotatable shaft, a bearing for said shaft, and an oil wiper at an end of the bearing and partly encircling the shaft, said wiper having a concave shaft-engaging portion having a succession of wiping edges which are inclined with respect to the shaft axis toward the bearing in the direction of shaft rotation for the return of oil on the shaft toward the bearing, the ends of said edges remote from the bearing extending further from the bearing progressively in the direction of shaft rotation.

8. In a construction of the character described, in combination, a rotatable shaft, a bearing for said shaft, and an oil wiper at an end of the bearing and partly encircling the top of the shaft, said wiper having a concave shaft-engaging portion provided with oil wiping edges which are inclined toward the bearing in the direction of shaft rotation for the return of oil on the shaft toward the bearing, that portion of the wiper engageable with the upturning side of the shaft tapering forwardly in width to a forward point located in a plane transverse of the shaft axis lying between opposite sides of said wiper.

9. In a construction of the character described, in combination, a rotatable shaft, upper and lower bearing segments for said shaft, the lower bearing segment extending outwardly beyond the upper segment, a housing for said segments, and a lubricant wiper in said housing at one end thereof closely adjacent the upper bearing segment for returning oil on said shaft to a position inwardly of the end of the lower bearing sleeve said wiper having a scraping edge fitting the shaft and extending at an angle toward the upper bearing segment and in the direction of shaft rotation, said wiper extending toward the upper bearing segment inwardly beyond the outermost point of contact between the shaft and the lower bearing segment and extending away from the upper bearing segment outwardly beyond the outermost point of contact between the shaft and the lower bearing.

10. In a construction of the character described, in combination, a rotatable shaft, upper and lower bearing segments for said shaft, upper and lower housing portions for said segments, and a lubricant wiper in said upper housing portion at one end thereof closely adjacent the upper bearing segment returning oil on said shaft to a position inwardly of the end of the lower bearing segment, said member having a loose connection with the upper housing portion and resting on the upper side of the shaft said wiper having a scraping edge fitting the shaft and extending at an angle toward the upper bearing segment and in the direction of shaft rotation, said wiper extending toward the upper bearing segment inwardly beyond the outermost point of contact between the shaft and the lower bearing segment and extending away from the upper bearing segment outwardly beyond the outermost point of contact between the shaft and the lower bearing.

11. In a construction of the character described, in combination, a rotatable shaft, upper and lower bearing segments for said shaft, a housing base and a housing cap for said segments, and a lubricant wiper within said housing at one end thereof closely adjacent the upper bearing sleeve returning oil along said shaft to a position inwardly of the end of the lower bearing segment, said member having a loose connection with the housing cap and resting on the upper side of the shaft, said wiper having successively acting cylindrically concave shaft-engaging surfaces providing successively acting oil wiping edges that are inclined with respect to the generatrix of the shaft cylinder in the direction of rotation and toward the bearing segments so that said edges move oil toward the bearing segments as the shaft rotates.

12. In a construction of the character described, in combination, a lower housing member having a bearing segment, and an upper housing member having an upper bearing segment, said lower and upper housing members respectively having spaced upwardly facing and downwardly facing surfaces extending outwardly laterally of the bearing away from said segments at an upward inclination and inclining downwardly toward the center of the bearing from the ends of the housing members and preventing loss of oil from the sides and ends of the bearing housing members.

13. In a construction of the character described, in combination, a lower housing member having a bearing sleeve, and an upper housing member having an upper bearing segment, said housing members respectively having upwardly and downwardly facing surfaces extending outwardly away from the sleeve segments at an upward inclination and inclining downwardly toward the center of the bearing from the ends of the housing members, a shaft rotatable in said bearing segments, and an oil wiper at each end of said upper housing member for returning oil along the shaft toward said bearing segments, said wipers having oil wiping edges which extend outwardly to points beyond the end of the lower bearing segment and which extend inwardly of the ends of the lower bearing segment.

STEPHEN A. STAEGE.